Feb. 20, 1945.　　　F. S. BASTER　　　2,369,937
CARBURETOR INTAKE AIR HEATER
Filed Nov. 29, 1941　　　2 Sheets-Sheet 1

INVENTOR.
FOREST S. BASTER
BY
ATTORNEYS.

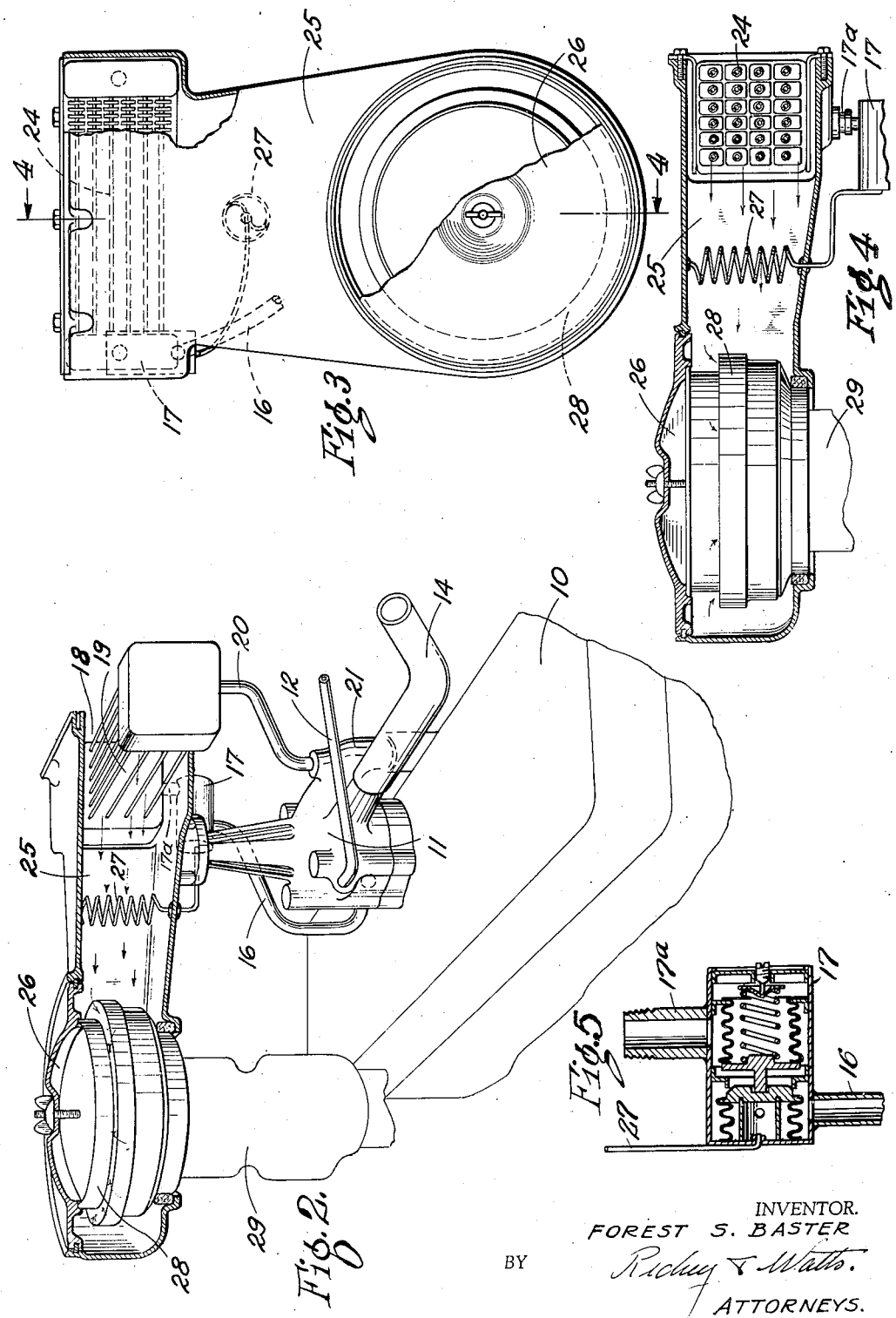

Patented Feb. 20, 1945

2,369,937

UNITED STATES PATENT OFFICE 2,369,937

CARBURETOR INTAKE AIR HEATER

Forest S. Baster, Cleveland, Ohio, assignor to The White Motor Company, Cleveland, Ohio, a corporation of Ohio Application November 29, 1941, Serial No. 421,056

3 Claims. (Cl. 123—122)

This invention relates to internal combustion engines and refers more particularly to heating means for the air intake of the fuel vaporizing system for such engine.

The principal object of this invention is to provide a method and apparatus for improving the vaporization and combustion of fuel in an internal combustion engine.

A further object of the invention is to provide apparatus for hydro-thermic control of air entering the inlet of the carburetor of such engine.

A still further object of the invention is to provide an air intake heating apparatus which may be attached to an air cleaner of such engine so that intake air may be warmed to a predetermined temperature and cleaned before entering the carburetor. Other objects and advantages will become manifest from the following description and claims.

The operation of an automotive vehicle in climates where air temperatures are constantly frigid and in latitudes which are seasonally cold presents an arduous problem of carburetion. The problem of overcoming inefficient engine performance during cold weather operation imposes several important ramifications consequent the inherent characteristics of internal combustion engines. Numerous attempts have been made in the past to surmount the aforementioned problem by devising methods and apparatus to deliver warmer air to the carburetor than that of outside air temperatures.

The degree to which a hydrocarbon fuel is vaporized is dependent either upon the amount of heat in the air with which it comes in contact or to the amount of turbulence created by air flow velocity to which it is subjected. Therefore, during part throttle operations, the intake air being at a relatively low velocity, it is necessary to heat this air in order to attain a satisfactory amount of vaporization during cold weather conditions. As the throttle is progressively advanced, the heat requirement to produce the same amount of vaporization becomes less because the air velocity and turbulence perform the same function as heat in vaporizing the fuel. It has been found that an internal combustion engine will run more efficiently at full throttle with a relatively cool air, that is, air whose temperature is below 130° F., than with an air fuel mixture whose temperature is higher than 130°. The reason for this conclusion is based upon the fact that there is a greater weight of oxygen present in cool air than in hot air, which therefore results in more complete combustion.

To the best of the inventor's knowledge, all former devices have failed to overcome the collective problem of efficient carburetion and economical engine performance during cold weather operations.

One of the most common methods of preheating the intake air is the so called "hot spot" heating system which operates by directing the incoming air through a tube which forms a jacket surrounding a section of the exhaust manifold at an area where the heat is the highest and, thence, into the inlet side of the carburetor. This method of heating the air fails to accomplish the desired results for several reasons. At full throttle operation, the hot spot heater is unsatisfactory because the air flowing through the jacket is heated to temperatures considerably above 130° F. Therefore, the air thus heated contains a relatively low percentage of oxygen to the fuel air mixture with the attendant result of inefficient carburetion. At part throttle operations, the hot spot method does not deliver enough heat to effectively vaporize the fuel because the engine is running at a relatively cool temperature at this time.

Another prior art system employed to heat the intake air is an oil heating exchange unit. This type of apparatus employs the use of a small radiator into which hot oil is pumped through its coils in a continuous circuit with the engine. The intake air is drawn through the said radiator and, thence, to the carburetor in a confined housing. It has been found that the oil is cooled slightly but the intake air is not heated sufficiently to improve the combustion of the fuel because of the fact that there are not enough B. t. u.'s in the normal volume of oil in an internal combustion engine to raise the temperature of the intake air to a high enough temperature range to improve combustion, that is, within a range of 100° to 130° F. and because oil has a low coefficient of specific heat radiation. It has been found in this system that the oil temperature never remains even and that it fluctuates rapidly in proportion to the speed of the engine and is critically influenced by outside air temperature conditions.

The present invention consists of utilizing the transference of heat from the liquid cooling system of an internal combustion engine in such a manner that the intake air may be heated to a predetermined temperature and maintained evenly throughout the operation of the engine from part throttle to full throttle irrespective of cold or hot weather. Exhaustive research has proved that the most efficient operation of the engine occurs when the intake air is delivered to the carburetor within the range of from 100° to 130° F. It will be obvious to those skilled in the art that various alterations and ramifications may be made to the present invention as shown and described without departing from the spirit thereof.

These and other objects will become apparent to those skilled in the art from the following description together with the accompanying drawings which form a part of the present description, in which:

Fig. 2 is a perspective cross sectional view of the engine block, air cleaner, air intake heater, and thermostat, having certain parts thereof broken away in the interest of clarity;

Fig. 3 is an elevation of an air cleaner, air intake heater, and thermostat; and Fig. 4 is a cross sectional view of the air cleaner, air heater, and thermostat, taken on line 4—4 of Fig. 3.

Fig. 5 is a section of the valve taken on the line 5—5 of Fig. 1.

Liquid circulatory system

Figure 1:
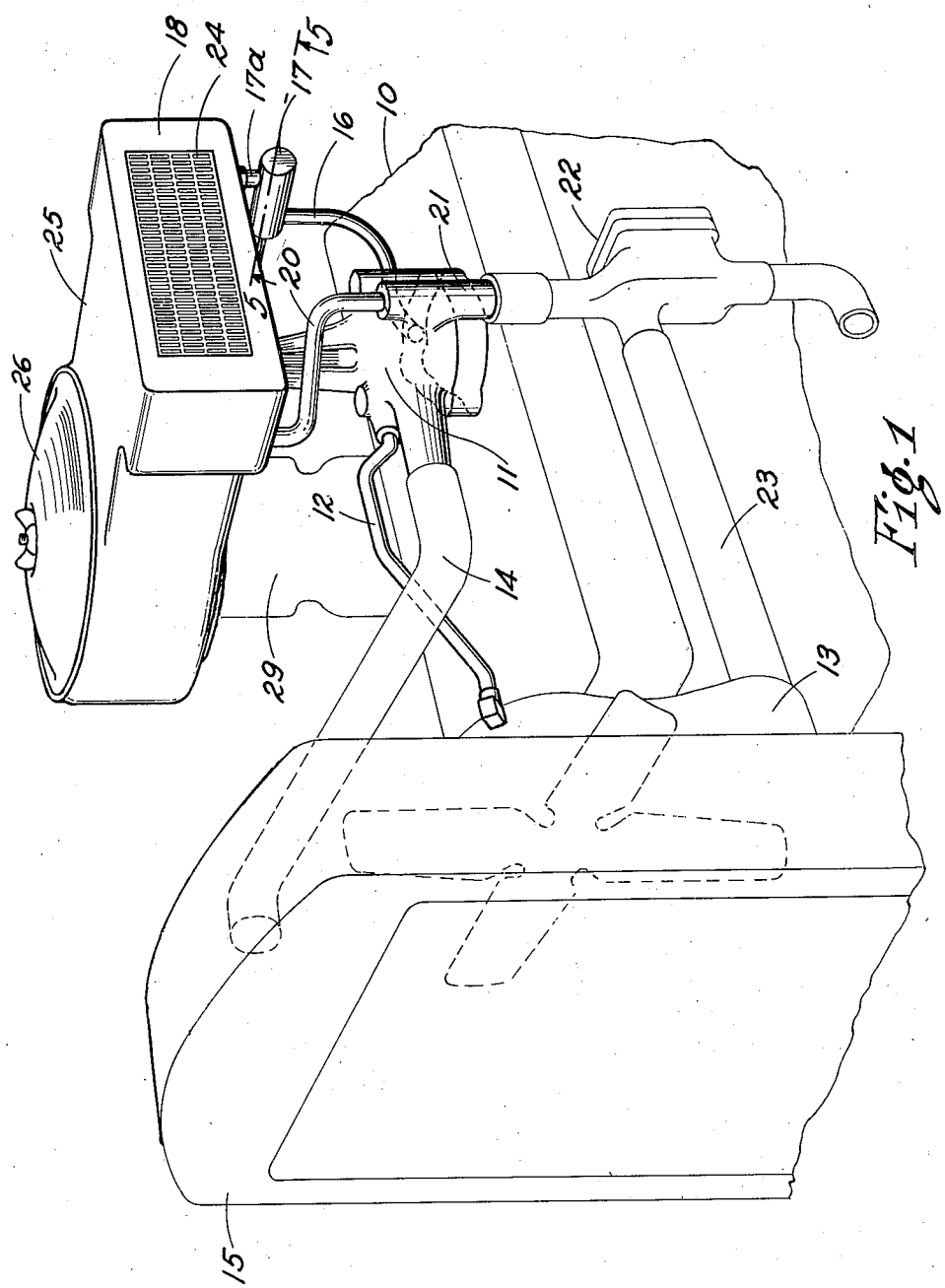
Fig. 1 is a perspective view of the block of an internal combustion engine, a cooling system radiator, a heat exchange unit, and an air cleaner attached thereto.

Referring to the drawings, the liquid coolant is pumped from the head of the engine 10 into a thermostatic by-pass valve 11 of an internal combustion engine cooling system. Said thermostat is provided with a bleeder pipe 12 in fluid communication with a water pump 13 and a radiator inlet pipe 14 in fluid communication with an orthodox radiator 15 of an internal combustion engine. The water is forced from said thermostat through a connecting pipe 16 and thence into a thermostatically controlled valve 17, then into a connecting pipe 17a and thence into a radiator or heat exchanger 18. The water circulates through a core 19 of said radiator from whence it travels downward through pipe 20 and into a header 21 of the engine thermostat 11, and thence to an oil heat exchanger 22 from where it flows through pipe 23 into the inlet side of the water pump 13. The liquid coolant is then again pumped through the head of the engine where it absorbs heat from the combustion chamber and again forcefully enters the engine thermostat, thus completing its circulatory cycle.

Air circulatory system

Air is drawn into the cellular section 24 of the radiator 18 and thence through a conduit 25 in fluid communication with an air cleaner housing 26 and flows by a thermostat 27 mounted therein into an open intake ring of an air cleaner 28 and thence into a carburetor 29. The temperature of the air entering the carburetor intake pipe may be kept at an even predetermined temperature by means of the thermostat 27 and the thermostatically controlled valve 17. When the temperature of the air which passes by the thermostat is below the predetermined standard, the thermostatically controlled valve 17 is in its wide open position, thereby allowing the maximum amount of liquid coolant to pass through said valve and on into the heat exchanger 18. If the temperature rises above that predetermined standard, the thermostat thereby restricts the orifice within the valve 17, thereby reducing the amount of coolant to enter the radiator 18. If the temperature should tend to fall below the predetermined standard, the thermostat will effect a more wide open position in the said valve 17 allowing a greater amount of water to enter said heat exchanger.

It is intended that all matter contained in the above description or shown in the accompanying drawings shall be interpreted as illustrative and not in a limiting sense.

What is claimed is:

1. An air heating device for use with the carburetor of an internal combustion engine having a liquid cooling system, comprising a heat exchanger arranged in liquid communication with said cooling system and an air cleaner supported by said carburetor and in fluid communication with said heat exchanger, and means associated with said heat exchanger for controlling the temperature of the air passing to said air cleaner.

2. A carburetor intake air heater for an internal combustion engine including a liquid cooling system, comprising a heat exchanger in liquid communication with said cooling system, a valve intermediate said cooling system and said heat exchanger for controlling the volume of liquid entering said heat exchanger, a carburetor intake air cleaner disposed in sealed relationship with said heat exchanger, and thermal responsive means associated with said air intake cleaner and operatively connected with said valve.

3. In an internal combustion engine embodying a radiator, a carburetor and an air cleaner in fluid communication with said carburetor mechanism for heating the air delivered to said carburetor comprising a conduit coupled with said air cleaner, a secondary radiator in the open end of said conduit, an intake pipe from the first named radiator to said secondary radiator, a return pipe from the secondary radiator to the first named radiator, a valve in said intake pipe for regulating the flow of water therethrough and a thermostat in said conduit operatively coupled with said valve for the control thereof.

FOREST S. BASTER.